United States Patent
Ichise et al.

(10) Patent No.: US 7,077,106 B2
(45) Date of Patent: Jul. 18, 2006

(54) SPARK IGNITION INTERNAL COMBUSTION ENGINE

(75) Inventors: Masaharu Ichise, Susono (JP);
Terutoshi Tomoda, Mishima (JP);
Yoshihiro Okada, Nagaizumi-cho (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/033,137

(22) Filed: Jan. 12, 2005

(65) Prior Publication Data
US 2005/0155577 A1 Jul. 21, 2005

(30) Foreign Application Priority Data
Jan. 19, 2004 (JP) .............................. 2004-009994

(51) Int. Cl.
*F02B 1/00* (2006.01)
(52) U.S. Cl. ...................... 123/429; 123/432
(58) Field of Classification Search ................ 123/429, 123/432
See application file for complete search history.

(56) References Cited

U.S. PATENT DOCUMENTS

| | | | |
|---|---|---|---|
| 4,726,341 A | * | 2/1988 | Muranaka et al. .......... 123/432 |
| 4,732,117 A | | 3/1988 | Tanahashi et al. |
| 5,009,200 A | * | 4/1991 | Van Basshuysen et al. ...................... 123/184.52 |
| 5,174,260 A | * | 12/1992 | Nonogawa et al. ......... 123/432 |
| 5,564,384 A | | 10/1996 | Ohsuga et al. |
| 5,651,344 A | | 7/1997 | Nishigaki et al. |
| 5,758,612 A | | 6/1998 | Tsuzuku et al. |
| 5,765,531 A | | 6/1998 | Yoshikawa et al. |
| 5,769,060 A | | 6/1998 | Matsumoto |
| 6,314,940 B1 | | 11/2001 | Frey et al. |

FOREIGN PATENT DOCUMENTS

| | | |
|---|---|---|
| JP | A 63-018173 | 1/1988 |
| JP | A 07-027033 | 1/1995 |
| JP | A 07-293304 | 11/1995 |
| JP | 08-193535 | 7/1996 |

\* cited by examiner

*Primary Examiner*—John T. Kwon
(74) *Attorney, Agent, or Firm*—Oliff & Berridge, PLC (57) ABSTRACT

Each cylinder is provided with an ignition plug, two intake valves, direct fuel injector, and a port fuel injector. When homogeneous combustion is demanded, the direct fuel injector and port fuel injector inject fuel on the same engine cycle. The port fuel injector is installed so that the amount of fuel directed toward outer regions of the intake valves is larger than that of fuel directed toward inner regions of the intake valves, thereby causing only fresh air to flow to regions near the inner regions of the intake valves.

4 Claims, 6 Drawing Sheets

SPARK IGNITION INTERNAL COMBUSTION ENGINE

BACKGROUND OF THE INVENTION

1. Field of the Invention

The present invention relates to a spark ignition internal combustion engine, and more particularly to a spark ignition internal combustion engine that is equipped with a port fuel injector and direct fuel injector.

2. Background Art

A conventionally known spark ignition internal combustion engine is disclosed, for instance, by Japanese Patent Laid-Open No. 293304/1995. This conventional spark ignition internal combustion engine comprises a port fuel injector for injecting fuel into an intake port of an internal combustion engine and direct fuel injector for directly injecting fuel into a cylinder of the internal combustion engine. During low-to-medium load operation, this conventional internal combustion engine invokes stratified combustion by supplying fuel according to direct injection technique. During high load operation, on the other hand, the conventional internal combustion engine invokes homogeneous combustion by supplying fuel according to a port injection technique.

When the intra-cylinder injection technique is used, an air-fuel mixture layer of high fuel concentration can be formed near a spark plug. In this instance, proper ignition can be achieved with a small amount of fuel; therefore, a stable operation can be performed at a lean air-fuel ratio. When the port injection technique is used, on the other hand, an air-fuel mixture of uniform concentration can be introduced into a cylinder. Consequently, a high output can be generated while stable combustion is maintained. As a result, the above-mentioned conventional internal combustion engine provides enhanced fuel efficiency and excellent operation characteristic.

However, when injected by the port injection technique, the fuel does not completely vaporize within the intake port and partly adheres to the wall surfaces of an intake valve and intake port. It is likely that various factors, including the fuel adhesion distribution and the air flowing upon valve opening, determine how the fuel adhering to the wall surface flows into the cylinder. Therefore, if the port injection technique is solely used, the air-fuel mixture within the cylinder cannot always be rendered homogeneous.

SUMMARY OF THE INVENTION

The present invention has been made to solve the above problems. It is an object of the present invention to provide a spark ignition internal combustion engine that is capable of rendering the air-fuel mixture within the cylinder more homogeneous than in a case where the port injection technique is solely used.

The above object of the present invention is achieved by a spark ignition internal combustion engine. The spark ignition internal combustion engine includes a spark plug for each cylinder, two intake valves for each cylinder. The spark ignition internal combustion engine also includes direct fuel injector for injecting fuel into a cylinder in such a manner as to form a rich layer at the center of the cylinder, a port fuel injector that injects fuel within an intake port to direct the fuel toward the two intake valves, and injection controller for causing the direct fuel injector and the port fuel injector to inject fuel on the same engine cycle. When each of the two intake valves is divided into an inner region and an outer region with a dividing line that runs orthogonal to a line segment joining the centers of the two intake valves and passes through the center of either of the two intake valves, the port fuel injector is positioned so that the amount of the fuel directed toward the outer region is larger than the amount of the fuel directed toward the inner region.

The above object of the present invention is also achieved by a spark ignition internal combustion engine. The spark ignition internal combustion engine includes a spark plug for each cylinder, two intake valves for each cylinder. The spark ignition internal combustion engine also includes direct fuel injector for injecting fuel into a cylinder in such a manner as to form a rich layer at the center of the cylinder, a port fuel injector that injects fuel within an intake port to direct the fuel toward the two intake valves, and injection controller for causing the direct fuel injector and the port fuel injector to inject fuel on the same engine cycle. When each of the two intake valves is divided into an inner region and an outer region with a dividing line that runs orthogonal to a line segment joining the centers of the two intake valves and passes through the center of either of the two intake valves, the port fuel injector is positioned so that the axis line of fuel injection toward either of the two intake valves is directed toward the outer region.

The above object of the present invention is also achieved by a spark ignition internal combustion engine. In the spark ignition internal combustion engine, each of the intake valves includes a partitioning member, which is convexly formed on each of the intake valves. The partitioning member defines a first region, which includes a central part of the outer region, and a second region, which includes a central part of the inner region.

The above object of the present invention is also achieved by a spark ignition internal combustion engine. The spark ignition internal combustion engine includes a spark plug for each cylinder, three intake valves for each cylinder. The spark ignition internal combustion engine also includes direct fuel injector for injecting fuel into a cylinder in such a manner as to form a rich layer at the center of the cylinder, a port fuel injector that injects fuel within an intake port, and injection controller for causing the direct fuel injector and the port fuel injector to inject fuel on the same engine cycle. The port fuel injector directs fuel toward only the two outer intake valves out of three that are provided for each cylinder.

Other and further objects, features and advantages of the invention will appear more fully from the following description.

BEST MODE OF CARRYING OUT THE INVENTION

FIRST EMBODIMENT

Figure 1:
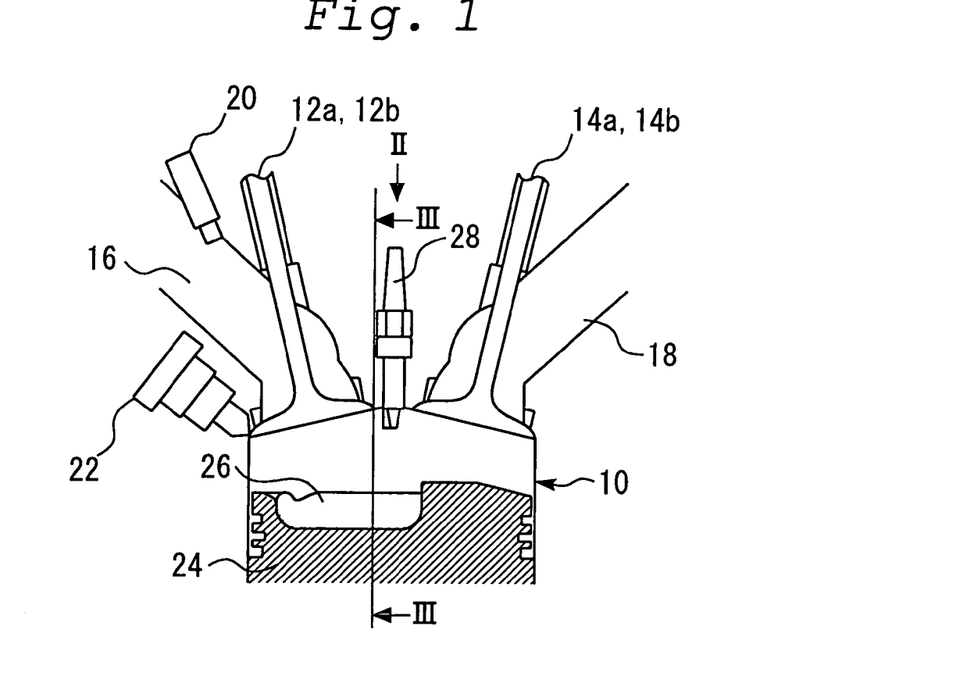
FIG. 1 illustrates the configuration of a first embodiment of the present invention.

FIG. 1 illustrates the configuration of a first embodiment of the present invention. The system shown in FIG. 1 is equipped with an internal combustion engine 10. The internal combustion engine 10 has a plurality of cylinders. However, FIG. 1 merely shows a cross section of one of the cylinders. Each cylinder of the internal combustion engine 10 has two intake valves 12a and 12b and two exhaust valves 14a and 14b. The internal combustion engine 10 communicates with an intake port 16 and an exhaust port 18. The intake port 16 communicates with the two intake valves 12a and 12b. The exhaust port 18 communicates with the two exhaust valves 14a and 14b.

The intake port 16 has an injector for providing internal fuel injection, that is, a port fuel injector 20 for providing port injection. The internal combustion engine 10 also has an injector for injecting fuel into a cylinder, that is, direct fuel injector 22 for providing intra-cylinder injection. Further, the internal combustion engine 10 has an ignition plug 28 for generating an ignition spark at the center of the cylinder.

A cavity 26 is provided in the top surface of a piston 24 of the internal combustion engine 10. The direct fuel injector 22 injects fuel and directs it toward the cavity 26 with predetermined intra-cylinder injection timing. The fuel directed toward the cavity 26 changes its course along the wall surface of the cavity and reaches a region near the cylinder center, that is, near the ignition plug 28. Therefore, the direct fuel injector 22 forms an air-fuel mixture layer of high fuel concentration near the ignition plug 28.

Figure 2:
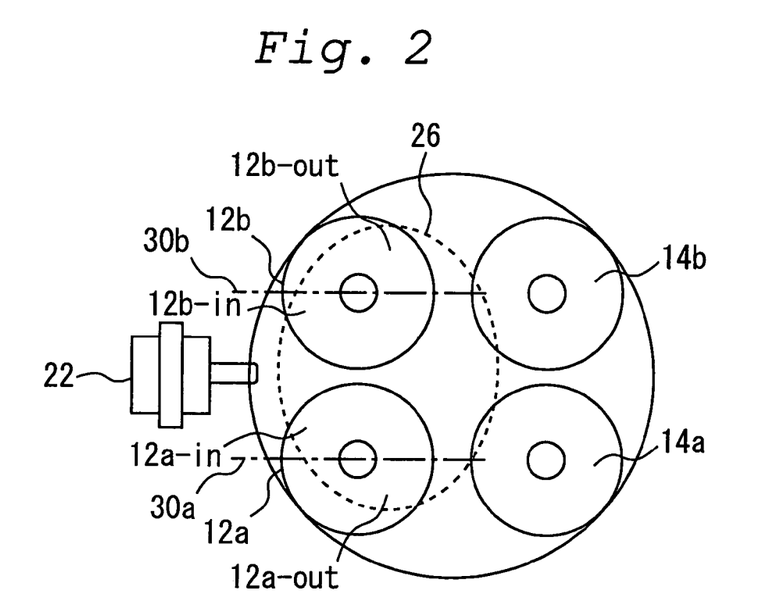
FIG. 2 presents view II of FIG. 1 to illustrate major elements of the first embodiment according to the present invention.

FIG. 2 presents view II of FIG. 1 to illustrate major elements of the internal combustion engine 10. Two straight chain lines in FIG. 2 represent dividing lines 30a and 30b for defining the outer regions 12a-out and 12b-out, and inner regions 12a-in and 12b-in of the intake valves 12a and 12b. The dividing lines 30a and 30b run orthogonal to a line segment joining the centers of the two intake valves 12a and 12b, and pass through the center of intake valve 12a or 12b. The present specification assumes that the dividing lines 30a and 30b divide each cylinder into inner and outer regions, and that the inner regions of each cylinder are referred to as the inner regions 12a-in and 12b-in of the intake valves 12a and 12b, and further that the outer regions of each cylinder are referred to as the outer regions 12a-out and 12b-out of the intake valves 12a and 12b.

In the present embodiment, the port fuel injector 20 has injection holes for directing fuel toward the two intake valves 12a and 12b, respectively. The injection hole for directing fuel toward intake valve 12a is positioned so that the fuel injection axis is oriented toward outer region 12a-out of intake valve 12a. Similarly, the injection hole for directing fuel toward intake valve 12b is positioned so that the fuel injection axis is oriented toward outer region 12b-out of intake valve 12b. Since the injection holes are positioned in the above manner, the amount of port-injected fuel adhering to outer regions 12a-out and 12b-out is sufficiently larger than that of port-injected fuel adhering to inner regions 12a-in and 12b-in.

Figure 3:
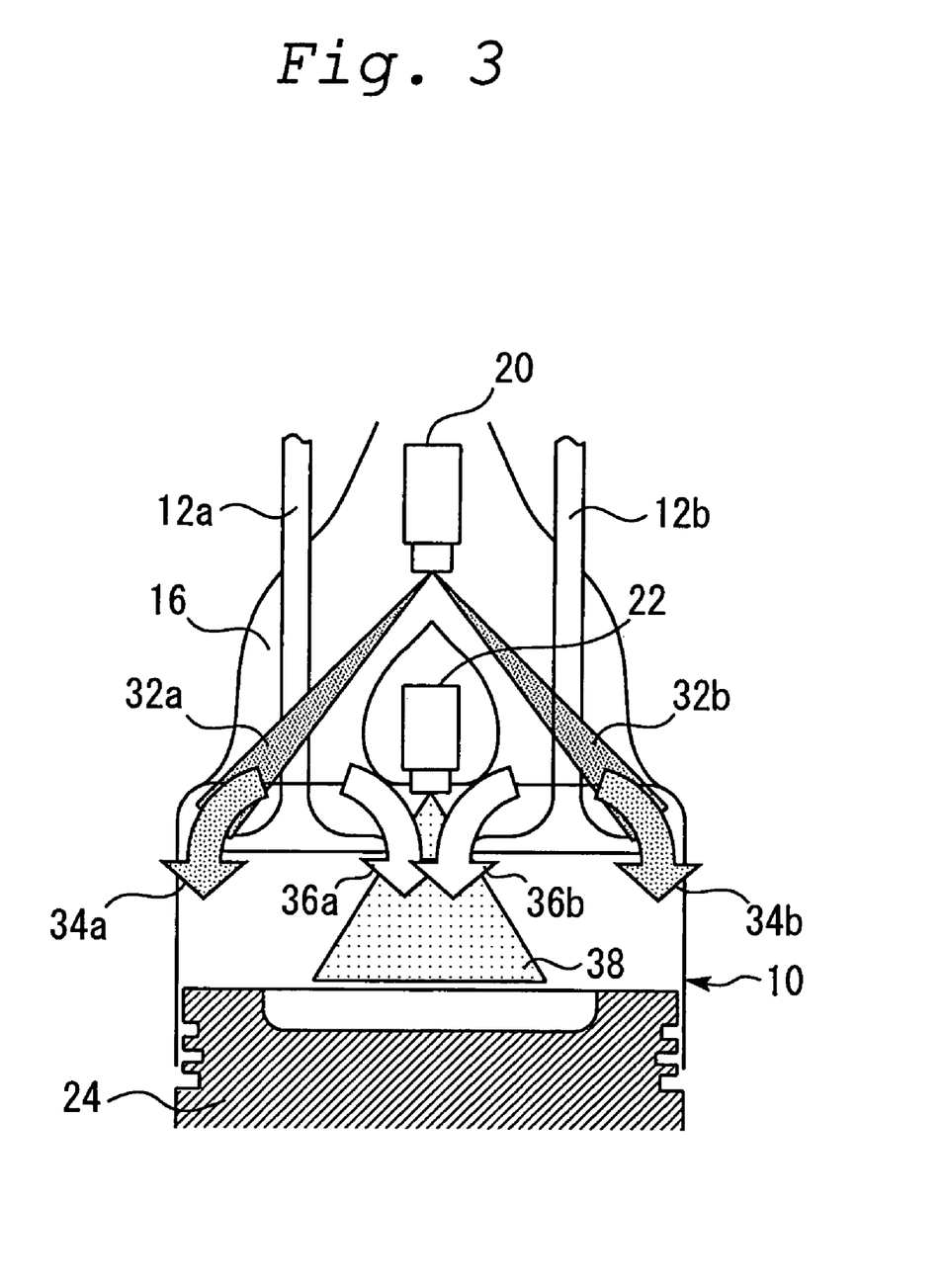
FIG. 3 is a cross-sectional view that is obtained when the internal combustion engine according to the first embodiment of the present invention is cut along straight line III—III, which is shown in FIG. 1.

FIG. 3 is a cross-sectional view that is obtained when the internal combustion engine 10 is cut along straight line III—III, which is shown in FIG. 1. In other words, FIG. 3 is a cross-sectional view that is obtained when the major elements of the internal combustion engine 10 are viewed in the direction squarely facing the two intake valves 12a, 12b.

In FIG. 3, graphic forms 32a and 32b represent fuel injections to indicate the flows of fuel that is directed toward the intake valves 12a and 12b by the port fuel injector 20. For the previously described reason, fuel defined by graphic forms 32a and 32b mainly adheres to the outer regions 12a-out and 12b-out of the intake valves 12a and 12b.

Arrows 34a and 34b in FIG. 3 indicate the flows of a gas that enters the cylinder from regions near the outer regions 12a-out and 12b-out when the intake valves 12a and 12b open. Arrows 36a and 36b, on the other hand, indicate the flows of a gas that enters the cylinder from regions near the inner regions 12a-in and 12b-in.

Port-injected fuel mainly adhere to the outer regions 12a-out and 12b-out of the intake valves 12a and 12b. Therefore, when the intake valves 12a and 12b open, air-fuel mixtures 34a and 34b, which have a high fuel concentration, enter the cylinder from regions near the outer regions 12a-out and 12b-out. Meanwhile, fresh air inflows 36a and 36b, which contain little fuel, occur from regions near the inner regions 12a-in and 12b-in. Therefore, when fuel is port-injected, the internal combustion engine 10 introduces an air-fuel mixture of high fuel concentration to only the inner periphery of the cylinder.

In FIG. 3, graphic form 38 represents a fuel injection to indicate the flow of fuel that is injected into the cylinder by the direct fuel injector 22. As indicated by this fuel injection 38, the use of the intra-cylinder injection technique makes it possible to form an air-fuel mixture layer of high fuel concentration at the center of each cylinder (namely, near the ignition plug 28).

In an operating region in which homogeneous combustion is demanded, the internal combustion engine 10 can cause both the port fuel injector 20 and direct fuel injector 22 to inject fuel on a single engine cycle. In this instance, an air-fuel mixture of appropriate fuel concentration is generated near the center of the cylinder because the intra-cylinder-injected fuel 38 mixes with the fresh air flows 36a, 36b that occur when the intake valves 12a and 12b open. Further, air-fuel mixtures 34a and 34b of appropriate fuel concentration are delivered to the inner periphery of the cylinder when the intake valves 12a and 12b open.

When the above fuel injection technique is used, the direct fuel injector 22 can be used to increase the fuel concentration at the inner center of the cylinder while allowing the port fuel injector 20 to increase the fuel concentration at the inner periphery of the cylinder. In this instance, the two injectors can be variously assigned to provide homogeneous fuel distribution within the cylinder. Therefore, when the fuel injection ratio between the two injectors 20 and 22 is adjusted, it is possible to ensure that the fuel concentration at the center of the cylinder matches the fuel concentration at the inner periphery of the cylinder.

If port injection is solely provided in a situation where homogeneous combustion is demanded, it is impossible to variously adjust the fuel concentration at the center of the cylinder and the fuel concentration at the inner periphery of the cylinder. Further, if most of the port-injected fuel flows to the center of the cylinder from regions near the inner regions 12a-in and 12b-in in a situation where port injection and intra-cylinder injection are simultaneously provided, it is impossible to variously adjust the fuel concentration at the center of the cylinder and the fuel concentration at the inner periphery of the cylinder. These injection techniques are hereinafter referred to as the "regular injection method".

When the fuel injection method according to the present embodiment is used, it is easy to ensure that the fuel concentration at the center of the cylinder matches the fuel concentration at the inner periphery of the cylinder as described earlier. Therefore, the internal combustion engine 10 according to the present embodiment exhibits better characteristics in terms of intra-cylinder air-fuel mixture homogeneity enhancement than in a case where the regular injection method is used.

In a situation where it is demanded that the internal combustion engine 10 provide homogeneous combustion, the first embodiment described above implements the "injection control means" according to the first or second aspect of the present invention by causing the direct fuel injector 22 and port fuel injector 20 to inject fuel on the same engine cycle.

SECOND EMBODIMENT

A second embodiment of the present invention will now be described with reference to FIGS. 4 through 6. The second embodiment of the internal combustion engine 10 is configured the same as the first embodiment except that intake valves 12a and 12b are equipped with partitioning boards 40a and 40b, respectively. The same elements as those used in the first embodiment will be described briefly or will not be described at all. The following explanation mainly deals with portions that are particular to the second embodiment.

Figure 4:
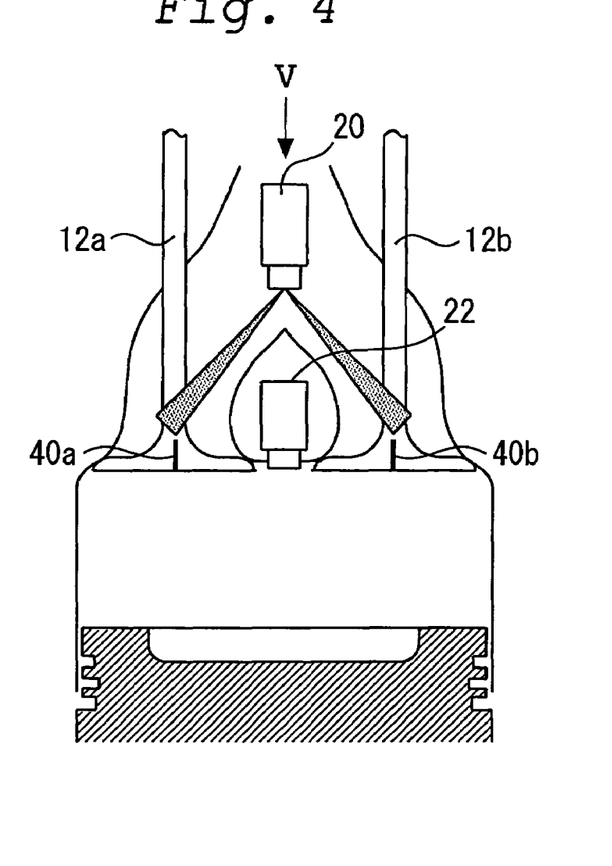
FIG. 4 is a cross-sectional view that is obtained when the internal combustion engine according to a second embodiment of the present invention is viewed in the direction squarely facing two intake valves.

FIG. 4 is a cross-sectional view illustrating major elements of the internal combustion engine 10 according to the present embodiment. This cross-sectional view is obtained when the major elements of the internal combustion engine 10 are viewed in the direction squarely facing the two intake valves 12a and 12b. As indicated in FIG. 4, the internal combustion engine 10 according to the present embodiment includes the partitioning boards 40a and 40b, which are convexly formed on the intake valves 12a and 12b.

Figure 5:
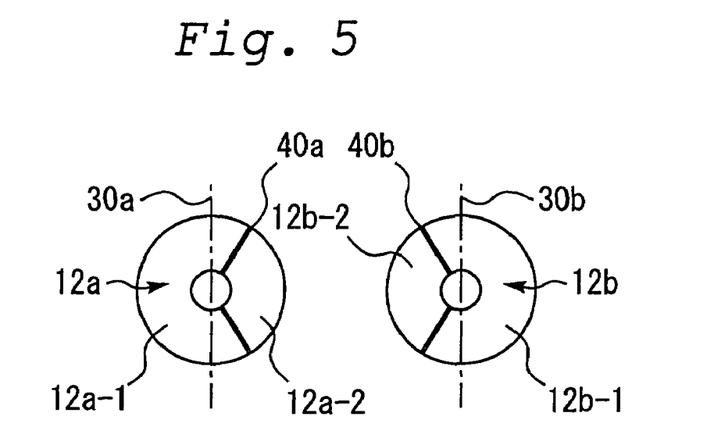
FIG. 5 presents view V of FIG. 4 to illustrate two intake valves according to the second embodiment of the present invention.

FIG. 5 presents view V of FIG. 4 to illustrate the intake valves 12a and 12b according to the present embodiment. Partitioning board 40a divides the surface region of intake valve 12a into a first region 12a-1 and second region 12a-2. Partitioning board 40b, on the other hand, divides the surface region of intake valve 12b into a first region 12b-1 and second region 12b-2. First regions 12a-1 and 12b-1 respectively contain the central portions of outer regions 12a-out and 12b-out (see FIG. 2) of intake valves 12a and 12b. Second regions 12a-2 and 12b-2, on the other hand, respectively contain the central portions of inner regions 12a-in and 12b-in (see FIG. 2) of intake valves 12a and 12b.

Figure 6:
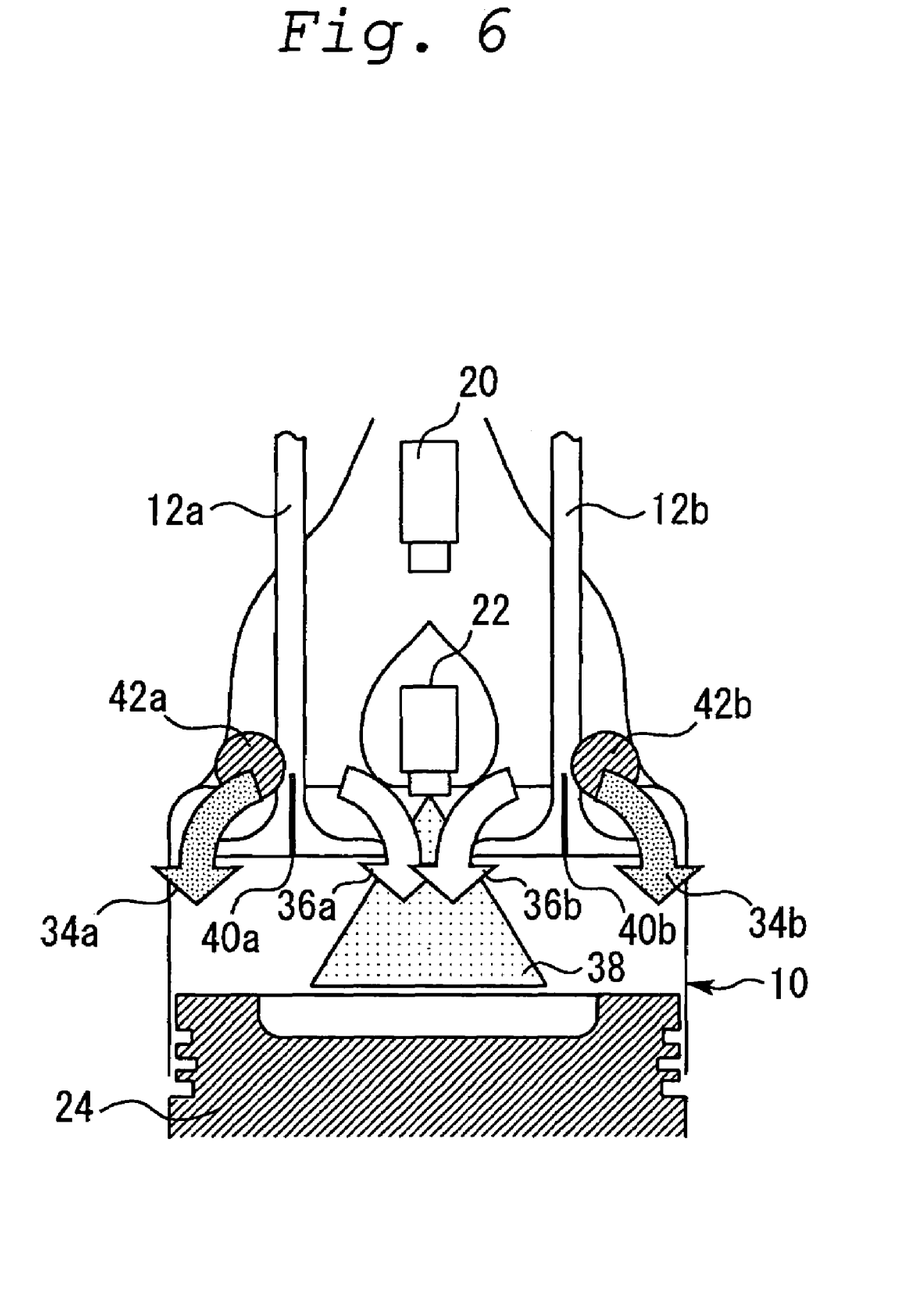
FIG. 6 illustrates the effects of partitioning boards for use in the second embodiment according to the present invention.

FIG. 6 illustrates the effects of partitioning boards 40a and 40b. In the present embodiment, too, the port fuel injector 20 injects fuel by directing it toward the outer regions 12a-out and 12b-out of the intake valves 12a and 12b as is the case in the first embodiment. More specifically, the port fuel injector 20 according to the present embodiment injects fuel by directing it toward first regions 12a-1 and 12b-1, which include the central portions of outer regions 12a-out and 12b-out.

If no partitioning boards 40a and 40b are provided, fuels 42a and 42b adhering to the intake valves 12a and 12b as a result of injection described above, may enter first regions 12a-1 and 12b-1 and second regions 12a-2 and 12b-2 via the surface of the intake valves 12a and 12b. In such an instance, port-injected fuel may partly mix with fresh air inflows 36a and 36b into the center of the cylinder. On the other hand, if partitioning boards 40a and 40b are provided, the fuel does not mix with the fresh air flows 36a and 36b because the entry of fuels 42a and 42b is avoided.

For homogeneous fuel distribution formation in the cylinder, it is preferred that the roles of the direct fuel injector 22 and port fuel injector 20 be clearly defined. More specifically, it is preferred that the fuel injected from the port fuel injector 20 flow only to the inner periphery of the cylinder without flowing to a region near the center of the cylinder. Partitioning boards 40a and 40b define the roles more clearly. As a result, the second embodiment of the internal combustion engine 10 provides air-fuel mixture homogeneity with higher accuracy than the first embodiment.

The second embodiment described above assumes that the first regions 12a-1 and 12b-1 are larger than the second regions 12a-2 and 12b-2. However, the present invention is not limited to such a relationship. More specifically, the first regions 12a-1 and 12b-1 may be equal in size to the second regions 12a-2 and 12b-2 as is the case with the outer regions 12a-out and 12b-out and inner regions 12a-in and 12b-in in the first embodiment.

THIRD EMBODIMENT

A third embodiment of the present invention will now be described with reference to FIGS. 7 through 10. The same elements as those used in the first embodiment are assigned the same reference numerals and will be described briefly or will not be described at all.

Figure 7:
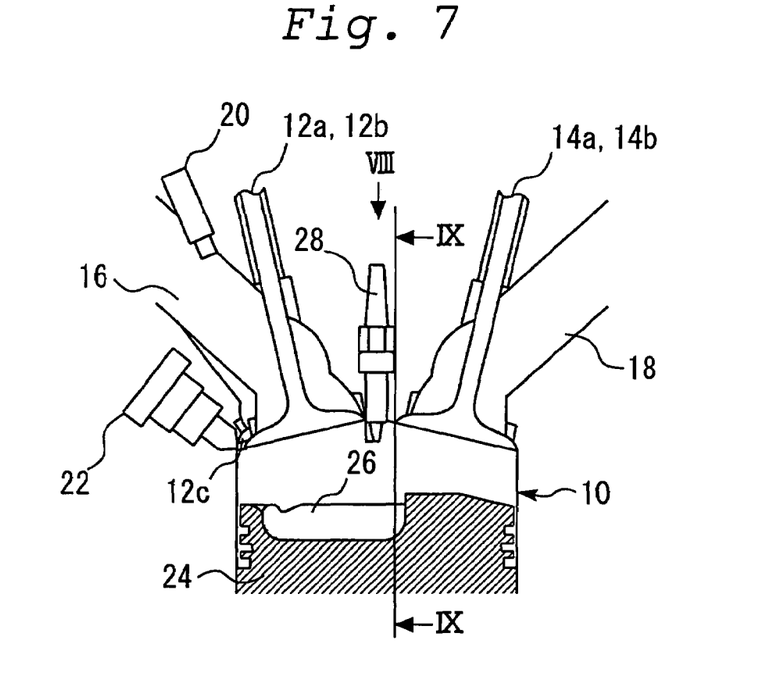
FIG. 7 illustrates the configuration of a third embodiment according to the present invention.
Figure 8:
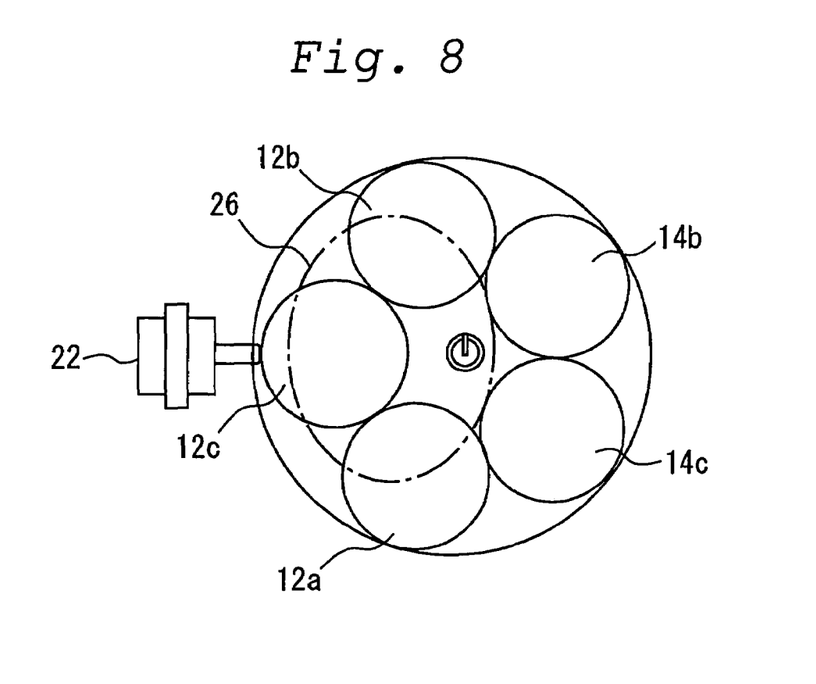
FIG. 8 presents view VIII of FIG. 7 to illustrate major elements of the third embodiment according to the present invention.

FIG. 7 illustrates the configuration of the internal combustion engine 10 according to the third embodiment. FIG. 8 presents view VIII of FIG. 7 to illustrate major elements of the internal combustion engine 10 according to the present embodiment. As indicated in these figures, each cylinder of the internal combustion engine 10 according to the present embodiment has three intake valves 12a, 12b and 12c. Intake valves 12a, 12b, and 12c are left-right symmetrically positioned as viewed from the port fuel injector 20 or direct fuel injector 22. More specifically, intake valve 12c is positioned at the center while intake valves 12a and 12b are positioned on both ends.

Figure 9:
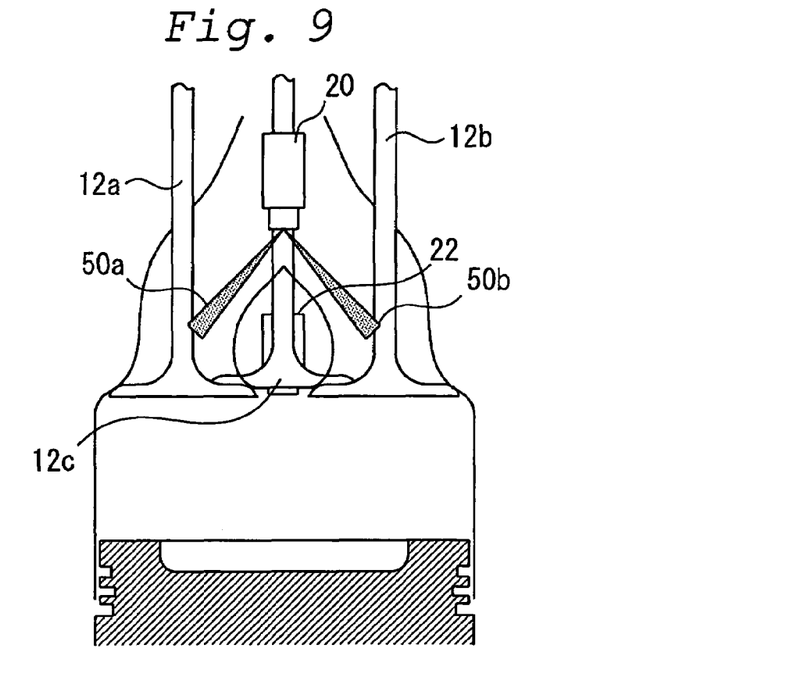
FIG. 9 is a cross-sectional view that is obtained when the internal combustion engine according to the third embodiment of the present embodiment is cut along straight line IX—IX, which is shown in FIG. 7.

FIG. 9 is a cross-sectional view that is obtained when the internal combustion engine 10 according to the present embodiment is cut along straight line IX—IX, which is shown in FIG. 7. In other words, FIG. 9 is a cross-sectional view that is obtained when the major elements of the internal combustion engine 10 are viewed in the direction squarely facing intake valves 12a and 12b, and 12c. In FIG. 9, graphic forms 50a and 50b represent fuel injections to indicate the flow of fuel that is injected from the port fuel injector 20. As indicated in the figure, the port fuel injector 20 injects fuels defined by graphic forms 50a and 50b while directing it toward intake valves 12a and 12b, which are positioned on both ends with the remaining intake valve 12c positioned at the center. In the internal combustion engine 10 according to the present embodiment, therefore, port-injected fuel mainly adheres to intake valves 12a and 12b, which are positioned on both ends, and almost no port-injected fuel adheres to intake valve 12c, which is positioned at the center.

Figure 10:
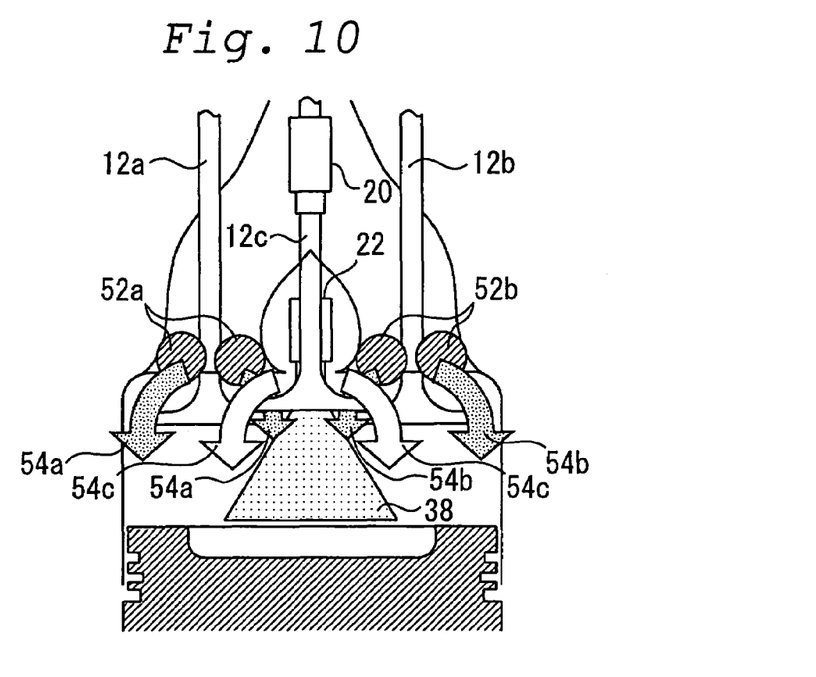
FIG. 10 illustrates the flows of a gas that is generated when three intake valves of the third embodiment according to the present invention open.

FIG. 10 illustrates the flows of a gas that is generated when intake valves 12a, 12b, and 12c of the internal combustion engine 10 according to the present embodiment open. In FIG. 10, the reference numerals 52a and 52b denote fuels that adhere to intake valves 12a and 12b, respectively, upon port injection. The reference numerals 54a, 54b, and 54c are used to indicate that a gas flows into the cylinder from regions near intake valves 12a and 12b when they open.

Port-injected fuel adheres to intake valves 12a and 12b. Therefore, when intake valves 12a and 12b open, air-fuel mixtures 54a and 54b flow into the cylinder from regions near intake valves 12a and 12b. Meanwhile, no port-injected fuel adheres to intake valve 12c. Therefore, fresh air 54c, which contains little fuel, flows inward from a region near intake valve 12c. In other words, when intake valves 12a, 12b, and 12c of the internal combustion engine 10 according to the present embodiment open, air-fuel mixtures 54a and 54b, which have a high fuel concentration, flow into the cylinder from regions near intake valves 12a and 12b, which are positioned at the inner periphery of each cylinder, whereas fresh air 54c, which contains no fuel, flows into the cylinder from a region near intake valve 12c, which is positioned at the center of the cylinder. As a result, the present embodiment is capable of port-injecting fuel to deliver an air-fuel mixture of high fuel concentration only to the inner periphery of the cylinder as is the case in the first or second embodiment.

In the present embodiment, too, intra-cylinder injection forms an air-fuel mixture layer of high fuel concentration at the center of each cylinder (namely, near the ignition plug 28). In an operating region in which homogeneous combustion is demanded, the internal combustion engine 10 causes both the port fuel injector 20 and direct fuel injector 22 to inject fuel on a single engine cycle. When the above fuel injection technique is used, the direct fuel injector 22 can be used to increase the fuel concentration at the inner center of the cylinder while allowing the port fuel injector 20 to increase the fuel concentration at the inner periphery of the cylinder as is the case in the first or second embodiment. Therefore, when the internal combustion engine 10 according to the present embodiment is used, it is easy to ensure that the fuel concentration at the center of the cylinder matches the fuel concentration at the inner periphery of the cylinder as is the case in the first or second embodiment.

In a situation where it is demanded that the internal combustion engine 10 provide homogeneous combustion, the third embodiment described above implements the "injection control means" according to the fourth aspect of the present invention by causing direct fuel injector 22 and port fuel injector 20 to inject fuel on the same engine cycle.

In a first aspect of the present invention, direct fuel injector is capable of injecting fuel in such a manner as to form a rich layer at the center of each cylinder. A port fuel injector is capable of injecting fuel while directing it toward two intake valves in such a manner that the amount of the fuel directed toward an outer region is larger than that of the fuel directed toward an inner region. If the amount of the fuel directed toward the outer region is larger than that of the fuel directed toward the inner region, a large amount of fuel is likely to enter the cylinder via a region near the intake valve outer region when the intake valves open. Therefore, the present invention increases the fuel concentration near the inner periphery of the cylinder when the port injection technique is used. According to the present invention, the direct fuel injector can be used to increase the fuel concentration at the inner center of the cylinder while allowing the port fuel injector to increase the fuel concentration near the inner periphery of the cylinder. In this instance, the two injectors can be variously assigned to provide homogeneous fuel distribution within the cylinder. As a result, the air-fuel mixture can be rendered more homogeneous than in a case where the port injection technique is solely used.

In a second aspect of the present invention, direct fuel injector is capable of injecting fuel in such a manner as to form a rich layer at the center of each cylinder. A port fuel injector is capable of injecting fuel by directing it toward two intake valves in such a manner that the fuel injection axis is oriented toward the outer region. When the fuel injection axis is oriented toward the outer region, a larger amount of fuel is likely to reach the outer region than the inner region. When the intake valves open while a larger amount of fuel reaches the outer region than the inner region, the fuel injected by the port injection technique flows into the cylinder in a larger amount from a region near the outer region than from a region near the inner region. Consequently, when the port injection technique is used in accordance with the present invention, the fuel concentration prevailing at the inner periphery of the cylinder increases. According to the present invention, therefore, the direct fuel injector can be used to increase the fuel concentration at the inner center of the cylinder while allowing the port fuel injector to increase the fuel concentration at the inner periphery of the cylinder. In this instance, the two injectors can be variously assigned to provide homogeneous fuel distribution within the cylinder. As a result, the air-fuel mixture can be rendered more homogeneous than in a case where the port injection technique is solely used.

In a third aspect of the present invention, a convex partitioning member, which is provided for each intake valve, prevents the fuel adhering to the outer region from flowing into the inner region. As a result, the present invention unfailingly increases the fuel concentration prevailing at the inner periphery of the cylinder by applying the port injection technique.

In a fourth aspect of the present invention, direct fuel injector is capable of injecting fuel in such a maimer as to form a rich layer at the center of each cylinder. A port fuel injector is capable of injecting fuel by directing it toward two outer intake valves out of three. When the port fuel injector injects fuel in the above manner, air flows inward mainly from a region near the central intake valve while an air-fuel mixture of high fuel concentration flows inward from a region near the two outer intake valves. Consequently, when the port injection technique is used in accordance with the present invention, the fuel concentration prevailing at the inner periphery of the cylinder increases. According to the present invention, therefore, the direct fuel injector can be used to increase the fuel concentration at the inner center of the cylinder while allowing the port fuel injector to increase the fuel concentration at the inner periphery of the cylinder. In this instance, the two injectors can be variously assigned to provide homogeneous fuel distribution within the cylinder. As a result, the air-fuel mixture can be rendered more homogeneous than in a case where the port injection technique is solely used Obviously many modifications and variations of the present invention are possible in the light of the above teachings. It is therefore to be understood that within the scope of the appended claims the invention may by practiced otherwise than as specifically described.

The entire disclosure of a Japanese Patent Application No. 2004-9994, filed on Jan. 19, 2004 including specification, claims, drawings and summary, on which the Convention priority of the present application is based, are incorporated herein by reference in its entirety.

The invention claimed is:

1. A spark ignition internal combustion engine comprising:
   a spark plug for each cylinder;
   two intake valves for each cylinder;
   direct fuel injector for injecting fuel into a cylinder in such a manner as to form a rich layer at the center of the cylinder;
   a port fuel injector that injects fuel within an intake port to direct the fuel toward said two intake valves; and
   injection control means for causing said direct fuel injector and said port fuel injector to inject fuel on the same engine cycle;
   wherein, when each of said two intake valves is divided into an inner region and an outer region with a dividing line that runs orthogonal to a line segment joining the centers of said two intake valves and passes through the center of either of said two intake valves, said port fuel injector is positioned so that the amount of the fuel directed toward said outer region is larger than the amount of the fuel directed toward said inner region.

2. The spark ignition internal combustion engine according to claim 1, wherein each of said intake valves includes a partitioning member, which is convexly formed on each of said intake valves, in order to define a first region, which includes a central part of said outer region, and a second region, which includes a central part of said inner region.

3. A spark ignition internal combustion engine comprising:
   a spark plug for each cylinder;
   two intake valves for each cylinder;
   direct fuel injector for injecting fuel into a cylinder in such a manner as to form a rich layer at the center of the cylinder;
   a port fuel injector that injects fuel within an intake port to direct the fuel toward said two intake valves; and
   injection control means for causing said direct fuel injector and said port fuel injector to inject fuel on the same engine cycle;
   wherein, when each of said two intake valves is divided into an inner region and an outer region with a dividing line that runs orthogonal to a line segment joining the centers of said two intake valves and passes through the center of either of said two intake valves, said port fuel injector is positioned so that the axis line of fuel injection toward either of said two intake valves is directed toward said outer region.

4. The spark ignition internal combustion engine according to claim 3, wherein each of said intake valves includes a partitioning member, which is convexly formed on each of said intake valves, in order to define a first region, which includes a central part of said outer region, and a second region, which includes a central part of said inner region.

* * * * *